US008655144B2

(12) United States Patent (10) Patent No.: US 8,655,144 B2
Alderson (45) Date of Patent: Feb. 18, 2014

(54) COMMUNICATION APPARATUS

(75) Inventor: Ross Alderson, West Midlands (GB)

(73) Assignee: Visual Investments International Ltd, London (GB)

( * ) Notice: Subject to any disclaimer, the term of this patent is extended or adjusted under 35 U.S.C. 154(b) by 0 days.

(21) Appl. No.: 13/011,282

(22) Filed: Jan. 21, 2011

(65) Prior Publication Data

US 2011/0286716 A1 Nov. 24, 2011

Related U.S. Application Data

(60) Provisional application No. 61/316,590, filed on Mar. 23, 2010.

(51) Int. Cl.
*H04N 9/80* (2006.01)
*H04H 60/33* (2008.01)
*H04N 7/173* (2011.01)

(52) U.S. Cl.
USPC ............. 386/239; 386/248; 725/10; 725/11; 725/105

(58) Field of Classification Search
USPC .................................. 386/200–234, 239–248
See application file for complete search history.

(56) References Cited

U.S. PATENT DOCUMENTS

| 8,170,395 | B2 * | 5/2012 | Sterner et al. | 386/248 |
|---|---|---|---|---|
| 2003/0041333 | A1 * | 2/2003 | Allen et al. | 725/106 |
| 2003/0195928 | A1 * | 10/2003 | Kamijo et al. | 709/204 |
| 2004/0098754 | A1 * | 5/2004 | Vella et al. | 725/135 |
| 2007/0266304 | A1 * | 11/2007 | Fletcher et al. | 715/500.1 |
| 2008/0059985 | A1 * | 3/2008 | Tasaka | 720/718 |
| 2008/0071875 | A1 * | 3/2008 | Koff et al. | 709/206 |
| 2008/0090553 | A1 * | 4/2008 | Wan et al. | 455/413 |
| 2009/0030988 | A1 * | 1/2009 | Kuhlke et al. | 709/206 |
| 2012/0017254 | A1 * | 1/2012 | Barclay et al. | 725/115 |

FOREIGN PATENT DOCUMENTS

JP P2006-155384 * 6/2006 ............. G06F 17/30

OTHER PUBLICATIONS

"5 Cool Video plug ins for WordPress", Anish, 2009.*
"ITP Research: Video Comments, A WordPress Plugin", NYU, 2005.*
"SceneChat Breaks Out Conversations About Videos", Liz Gannes, Sep. 2011.*
"SceneChat Latest to Add Social Sharing Features to Video", Troy Dreier, Sep. 2011.*

* cited by examiner

*Primary Examiner* — Hung Dang
(74) *Attorney, Agent, or Firm* — Finnegan, Henderson, Farabow, Garrett & Dunner, L.L.P.

(57) ABSTRACT

A computer conversation system comprising: at least one server including a processor and memory and configured for communication with a plurality of user computers which each comprise a display; a video recording application configured to record video or receive recorded video from some, and preferably all, of the individual computers of the plurality of user computers; wherein the at least one server is configured to send a sequence of recorded videos to the plurality of users, the sequence of recorded videos based on the videos recorded or received from the individual computers and optionally the system is configured to send a file to the plurality of user computers which results in each of the plurality of computers displaying on the display an array of visual indicators in a set order, wherein each of a plurality of the visual indicators corresponds to at least one recorded video to be sent by the server, and the set order of the array corresponds to the order of at least part of the sequence of recorded video.

20 Claims, 7 Drawing Sheets

COMMUNICATION APPARATUS

This application claims benefit of priority of U.S. Provisional Patent Application No. 61/316,590, filed on Mar. 23, 2010, which is incorporated herein by reference in its entirety.

This invention relates to systems and methods for enabling efficient communication, in particular video communication, between people via computers, in particular communication accompanying a video stream.

It is known to provide a video streaming server which streams video content over the internet. It also known to provide video decoding software (codecs) on computers of end users which can connect to the internet and receive and play the streamed video content.

It has become increasingly common to provide so called "video on demand" via video streaming severs which allow people using a computer (which may be a conventional desktop computer or a simplified set top box for connection to television) to choose content from a remote database of video content. It has also become increasingly common to stream live events such as sports events, music concerts etc. over the internet using video streaming servers. With live events it is known to provide a text based chat room alongside the video. These allow people to commentate on the events of the video in real time. However, typically in order to commentate on events a user must enter texts into a long and frequently changing chain of communications from hundreds of others and therefore it is difficult to use the chat room to hold conversations with friends.

It is known to provide software to allow two users to make a video call over the internet. By using cameras, such as those embedded into modern notebook computers, along with appropriate software, two remote users can see each others image and converse. Such software may also allow a third user to enter into the conversation which may result in all three users seeing video footage of the other two. The more users that are added the more difficult it becomes to have a coherent conversation. A particular problem is when two or more users talk at the same time. This often results in intelligible audio. Another known problem of multiple users is that in the event of several users talking over each other all users will cease talking at the same time, resulting in a pause, and will recommence talking again at the same time, resulting in fractured conversation. There is also a very large bandwidth requirement for the interne connections, since video from multiple sources must be downloaded simultaneously with footage from each users camera being uploaded to the other users. Often, even with high bandwidth connections the multiple feeds may result in the degradation of the link quality. This may also lead to delays in the transmission which in turn further leads to fractured conversation.

It is also known to provide commercial video conferencing systems. These are similar to the above video call systems but as well as being more robust are specifically designed to cope with multiple users per camera site and to enable a larger number of users to talk to each other. However, such systems rely on the conventional protocols of human conversation to allow coherent video communication to take place. If people from multiple sites talk simultaneously then audio and video from each of these is broadcast simultaneously, as well as the large bandwidth requirements, this makes it nearly impossible to hear and understand all the information being sent. Known aids to reduce the possibility of such noisy unintelligible situations are a/ to show video footage of each site to each other site regardless of whether anyone there is talking and b/ to provide adjusting cameras that can be zoomed onto the faces of those talking. One reason these technical aids help is that in normal face to face conversations people pick up on visual queues and facial expressions to calculate when others are likely to start or stop speaking. By allowing users at each camera site to watch all other users at all times and by focusing more closely on those speaking, these normal human skills can be used by participants in the video conference to allow for more coherent communication. However, the more people present in the conversation the more difficult this becomes and the more likely that unintelligible simultaneous speaking occurs, the more cluttered any display screen becomes with images of others and the greater the bandwidth requirements.

Video calling and conferencing software and systems also rely on conversation replicating real time face to face conversations. For this reason any time delays in broadcasts from any user can cause major problems and if the delay is different for different users the systems can become unworkable. Consequently such systems attempt to use complex and often computationally expensive mechanisms to reduce any delays.

Where some or all users suffer delays it can be very difficult for a user to join a conversation.

It has been found by the applicant that conventional video conferencing or calling is not suitable to be used to accompany video streams. The number of people that may be involved and the desire for much of the users screens to display the stream mean that it may not be desirable to display images of all connected users at once. Because the users are primarily concentrating on the stream they are less able to check for visual queues from other users and in practice the result is multiple overlapping video comments from multiple users which results in an unintelligible noise. Such systems also require large amounts of bandwidth and computational resource in order to decipher, decode and display multiple broadcast at once. Additionally, the multiple overlapping video may result in degradation of the link quality between users and of the main content, which is clearly undesirable.

It is an object of the invention to mitigate, and potentially solve, at least some of the above problems.

According to a first aspect there is provided a computer conversation system comprising: at least one server including a processor and memory and configured for communication with a plurality of user computers which each comprise a display; a video recording application configured to record video or receive recorded video from some, and preferably all, of the individual computers of the plurality of user computers; wherein the at least one server is configured to send a sequence of recorded videos to the plurality of users, the sequence of recorded videos based on the videos recorded or received from the individual computers and optionally the system is configured to send a file to the plurality of user computers which results in each of the plurality of computers displaying on the display an array of visual indicators in a set order, wherein each of a plurality of the visual indicators corresponds to at least one recorded video to be sent by the server, and the set order of the array corresponds to the order of at least part of the sequence of recorded video.

There is also provided a method of entering or creating a room to watch a video stream, wherein a first user, such as the room creator or administrator, is enabled to send or receive invitation requests to/from other users to join the room and only access to the room when an invitation request has been accepted. Optionally the room allows the users to upload content of a predetermined length that is preferably, but optionally, placed in a queue and shown to other users. Preferably the queue is a visual queue to allow the other users to see what user uploaded content will be shown next.

Embodiments of the invention will be described, by way of example only, with reference to the following drawings in which:

FIG. 2 is a flow chart of a process of selecting a group to converse with;

Figure 1:
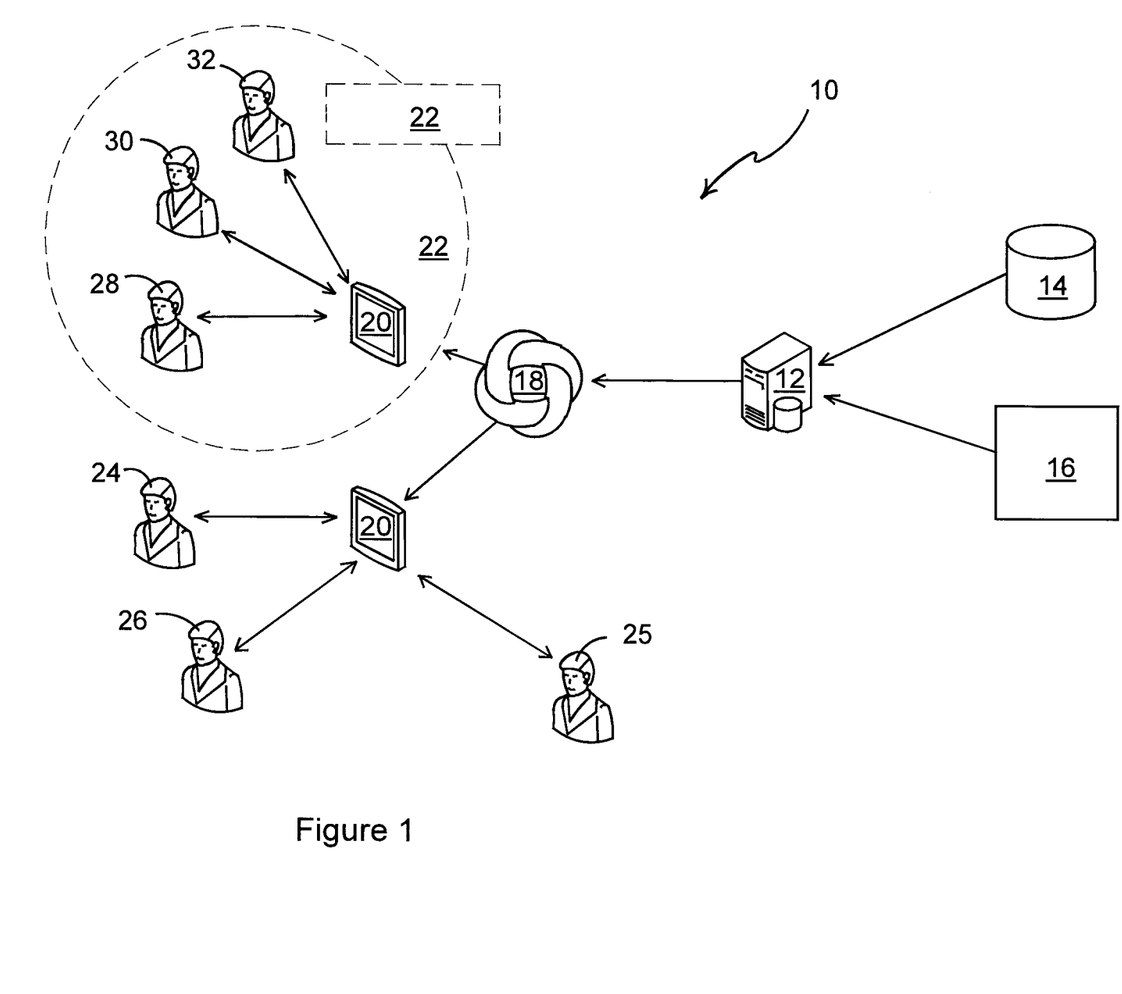
FIG. 1 is a schematic diagram of a system in accordance with the invention.

Referring to FIG. 1 there is shown embodiment of a conversation computer system 10 in accordance with the invention.

The conversation computer system (10) comprises a streaming server 12, video on demand database 14, live event apparatus 16, an interactive application/server 18 an open room 20 and a private room 22. The system 10 includes a number of users 24, 26, 28, 30 and 32 each working on a computer who are present either in the private room 22 or open/public room 24 which are described below.

The streaming server 12 works in a conventional way. Such streaming servers are known and any suitable streaming server may be used. The streaming server 12 in this case takes its inputs from video on demand database 14 (which is a database of a large number of previously recorded videos) and live event apparatus 16 which comprises a connected array of cameras and microphones at a live event such as a sports event or music concert. The streaming server 12 is able to stream from the live event apparatus 16 and when it requests specific videos from the video on demand database 14 is able to stream the requested video.

Examples of interactive servers and applications 18 are described later in relation to FIG. 3. Generally it is envisaged that the invention will be used with some form of interactive media such as video on top of the streamed events as described in relation to FIG. 3. However, in an alternative embodiment the video stream may be displayed in an entirely conventional manner without an interactive element. In this case the interactive element/server 18 merely relates to the management of users 24-32 and how they are allocated to different rooms 20, 22.

The system 10 includes, or has access to, lists of registered users who are able to watch the stream from streaming server 12. Each of these registered users has the a facility to name other registered users as being part of their group of "friends". Typically the registered users have to enter log in details in order to watch a stream from streaming server 12 and known technology for validating that the correct users are connected to the correct stream may be used.

In an embodiment, the lists of registered users and their relationships between them such as those who consider each other to be 'friends' may be stored on the interactive server 18. In preferred embodiments, the interactive application 18 is an application that runs within an existing social networking website such as Facebook™. Many social networking websites, including Facebook, already store and manage lists of registered users including log in details and including lists of those users who have allowed each other to be considered 'friends'. In the case of Facebook this is provided by a particular user inviting another user to be their 'friend' and depending upon whether the other user accepts or declines this invitation they will then be listed in the database as friends or not. By providing the interactive application as an application within a social networking site, the system 10 does not require its own database of registrations nor require each user 24-32 to have registered their details specifically for system 10. Instead the system 10 uses the registered users and groups of friends provided by the social networking site so that users need only have registered for the existing social networking website.

An open room (20) may have been set up by an administrator of the system (10) or may be set up by a specific user such as user 24. An open room (20) is one where any user may enter, that is to say that need not have been invited to join or request permission to join.

In the example shown in FIG. 1, the open room is shown to be accessed by a first user 24, first users friend 26 and an uninvited guest user 25. In preferred embodiments each of these users 24 to 26 will be registered and have logged in but in the case of the open room 20 in some embodiments it may be possible for unregistered users to join the room 20 and access the stream without providing any log in details. Though in the preferred embodiment, the user will be required to register/log in to join an open room.

Each of first user 24, first user's friend 26 and uninvited guest user 25 are able to watch the stream chosen for the creation of open room 20 which could be a video from the video on demand database 14 or some live event from live event apparatus 16. In an embodiment it is known that first user 24 and first user's friend 26 are registered as friends. This may not have had any relevance to the setting or how they came to access open room 20. Alternatively, first user 24, having found the open room 20 may have sent an invite to first user's friend 26 to suggest they join the open room 20.

Private room 22 has been set up by a user, in this case second user 28. The private room (22) is one where only persons whom have been invited are allowed to access. In this case two of the second user's friends 30 and 32 have joined the private room and are viewing the stream with him. In a preferred embodiment, the second user's friends 30 and 32 are only able to access the room once they have accepted the request. If an uninvited guest wishes to view a stream they are able to sign into the open room 20 but are not able to sign into the private room 22 without being invited to do so. In a further embodiment, the uninvited guest may send a request to the user who has set up the room (in the present example the second user 28) to enter the room. The uninvited guest is unable to enter room unless the user who has set up the room (or a user with admin rights to the room) accepts the request.

In a preferred embodiment, the user who sets up the private room 22 has control over the video stream. For example, the user may choose to switch between live events e.g. different football matches, or for a video-on-demand service they can fast forward, pause, rewind etc. the stream. As the user has control over the video stream all other users in the room (i.e. those who have accepted a request to join the room) will view the same stream.

As well as (or instead of) an interactive video element as described below, the system 10 may provide a conventional chat function allowing users in any given room to speak to each other via text, simultaneously with watching the stream.

Figure 2:
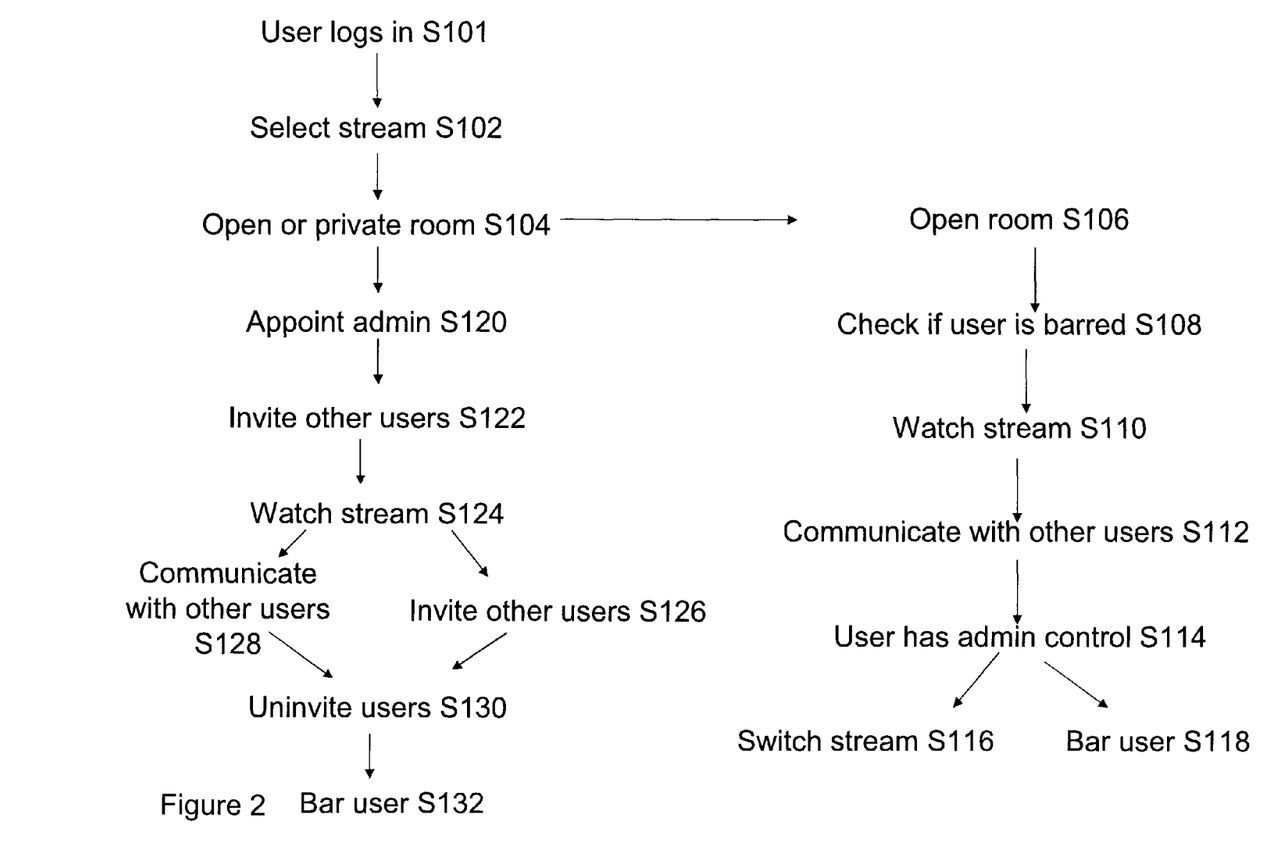

FIG. 2 shows a process 100 of setting up a room 20 or 22.

At step S101, a user logs into system 10. Where the interactive application 18 is an application for a social network website, the user may instead login to the existing social network website and access the interactive application 18 and open it through a webpage of that social networking site. This may be provided for example by PHP coding. Once the interactive application has been opened and the user is logged in, then at step S102, the user selects a stream. The user may for example be presented with a plurality of streams corresponding to live events that are happening at that time along with the contents of the video on demand database 14. Once a stream is selected at step S102 the user is asked whether they wish to create/join an open room or to create a private room 22. If the user selects an open room they proceed to step S106 and if they choose a private room they proceed to step S120. If a user wishes to view a stream by themselves, the process of doing so is the same as creating a private room at step S120 but they do not invite further people to join them.

At step S106 if there are no open rooms that currently exist for the particular selected stream, a new open room 20 is created. If an open room already exists for the selected stream then, dependent on the particulars of the implementation of the embodiment, the user may simply be added to an existing room of that stream already populated with users, or may be given the option of creating a new open room corresponding to the same stream as the existing ones.

At step S108 the system determines whether a particular user has been blocked by the administrator of the open room 20. This is unlikely to happen if a new open room is started, but where a user has been added to an existing open room it is possible that whoever is in charge of administrating the open room (which in the preferred embodiment is the first user to open it or could be a member of staff involve in running the system 10) then they may have blocked certain users, for example if they had been writing unacceptably abusive comments in previous text sessions. If a user has been blocked they will be denied entry to the room. If the user has not been blocked then they will proceed to step S110. At S110 the user is able to watch the stream. This may for example be supplied as a Flash file played in a Flash Player embedded into the web-browser of the user.

Whilst watching the stream, at step S112 the user may communicate with other users in the open room by text using a conventional chat room. Alternatively they can communicate by other media using methods described below. At step S114 it may be that the user has been given some administrative control over the open room 20, (particularly if they were the user who created the room), which may allow them for instance to block other users from entering the open room 20 at step S118 or switch the room 20 to a different stream from streaming server 12 at step S116. Alternatively, the user with administrative control may pause, rewind, fast-forward (if the stream is a pre-recorded stream) etc. the stream.

At step S120 the user who set up the private 22 room is appointed the administrator/host of that private room 22. Next at step S122 the user is provided with a list of their registered friends (such as their friends on Facebook) and can select from this list which friends are to be invited to join the private room 22. Alternatively some users may be marked as being 'allowed to join' the room 22 without being specifically informed of its existence. Next at step S124 the user watches the stream in the same manner as at step S110. The other friends in the private room 22 will also watch in a similar fashion.

Whilst the stream is continuing, in parallel at steps S128 and S126, the user can communicate via known means such as a text box, video or audio messaging etc. with the other friends in the private room 22 in a similar manner to step S112 and the administrator/host user may continue to invite other friends at step S126.

At step S130 the user is able to use administration rights in order to block/uninvite users from the room and potentially also at step S132 to bar access for another to the communications such as the text based chat room or video conversation described below.

The extent to which data is rendered and controlled at the server side on interactive server 18 or on the (client) side at each of the individual users 24, 26 and 25's computers varies between different embodiments. The preferred embodiment in which the interactive application 18 runs through a social networking site is run on the server side as much as possible. This allows for minimal downloading before access to a room 20 and also allows for a more uniform experience for any given user 24 independent of the particular computer they happen to login from. Typically, however there will be some form of application hosted the computer of each of the users 24-32 such as Flash™ Player which is a well known proprietary player which many or most users are likely to already have installed into their web browser.

Figure 3:
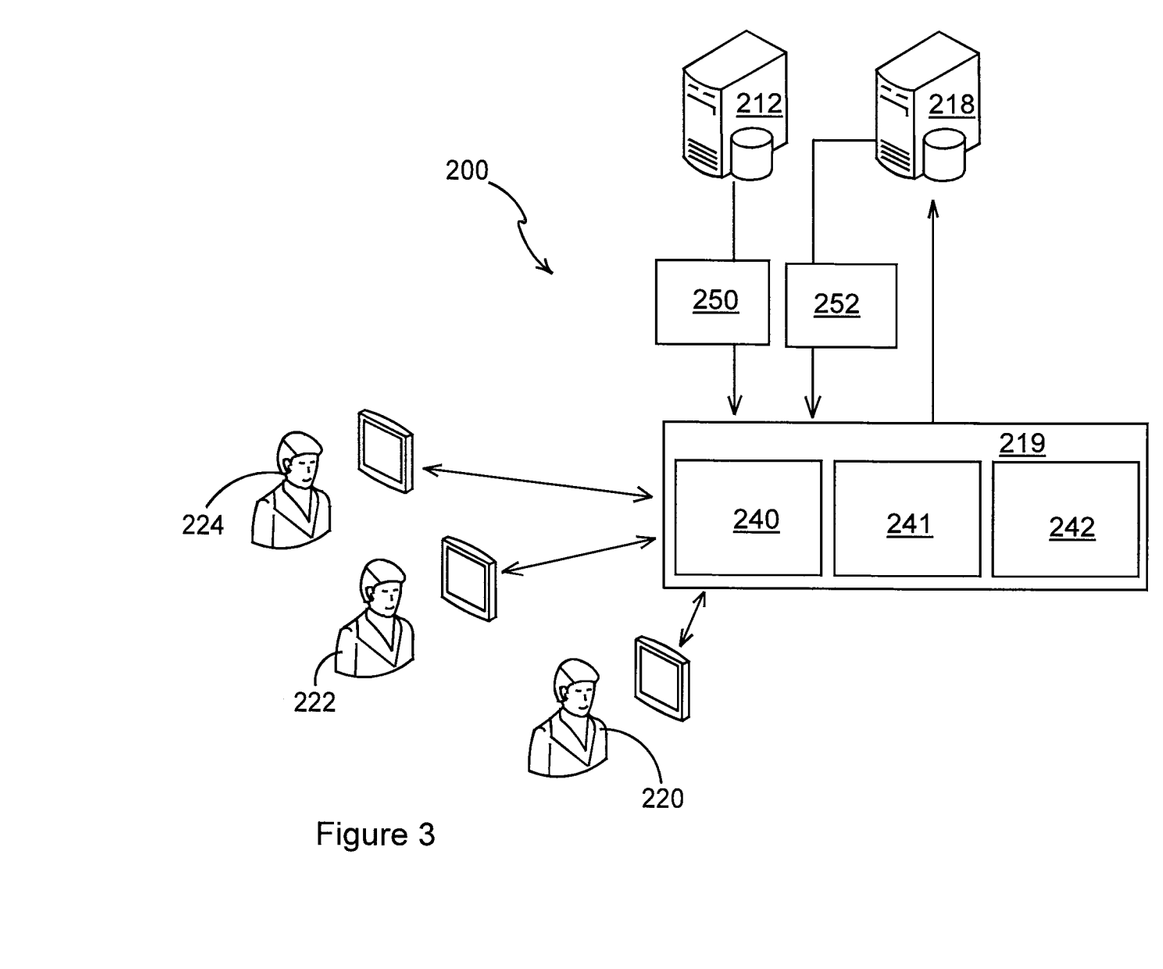
FIG. 3 is a diagram of a conversation application in communication with computers.

In FIG. 3 is shown a more detailed example of an interactive server/application 18. In FIG. 3 is shown system 200 where features equivalent to those depicted in FIG. 1 are given the same reference number but preceded by a '2'.

In FIG. 2 the interactive server/application 18 is depicted as interactive server 218 and conversation application 219.

Conversation application 219 may be individually supplied (such as by download) to each user 222 to 224, or may be provided wholly as a web application hosted by the interactive server 218. In the preferred embodiment the situation is somewhere in between these two. As it is hosted in a social networking site which can be accessed by users from numerous computers without having to rely on the same programs being downloaded the majority of the conversation application 219 takes place on a server (such as interactive server 218). At the user end, Flash Player is used though a web-browser.

The conversation application 219 provides for a Flash Player 240 (or equivalent) a Flash video/audio recorder and previewer 241 and third party plug ins 242. The Flash Player 240 is provided at the client computers 220, 222, 224 used by the users. The Flash video/audio recorder and previewer 241 can be provided server side since Flash Player allows for Flash files loaded into it to access video cameras and microphones. As described later, however, it will enable some client sided control, in particular where a user wants to preview or replay a video. Lastly the third party plug-ins could take numerous forms and may be downloaded to the individual computer of user 220-224. Examples of third party-plugins include voice distorting algorithms, icons or video snippets etc. Alternatively since on system 10 each user is registered and has a login, the third party plug ins can be saved at the server 218 with meta-data for each user that has that third party plug informing the server that when a user logs in and accesses the conversation application 219 that the third party plug ins they have purchased or configured into the applications should be added.

The conversation application 219 takes input feeds of a primary video feed 250 from the streaming server 212 and a conversation audio visual stream of video, audio and images from the interactive server 218. As an output the conversation application 219 sends video and audio from specific user's computers 220-224 to the interactive server 218 via the recorder/preview 241.

In order for video, audio or images from computers 220-224 to be recorded and transmitted external video cameras and microphones can be provided but many modern note book computers already include these integrally in the casing as standard.

Figure 4:
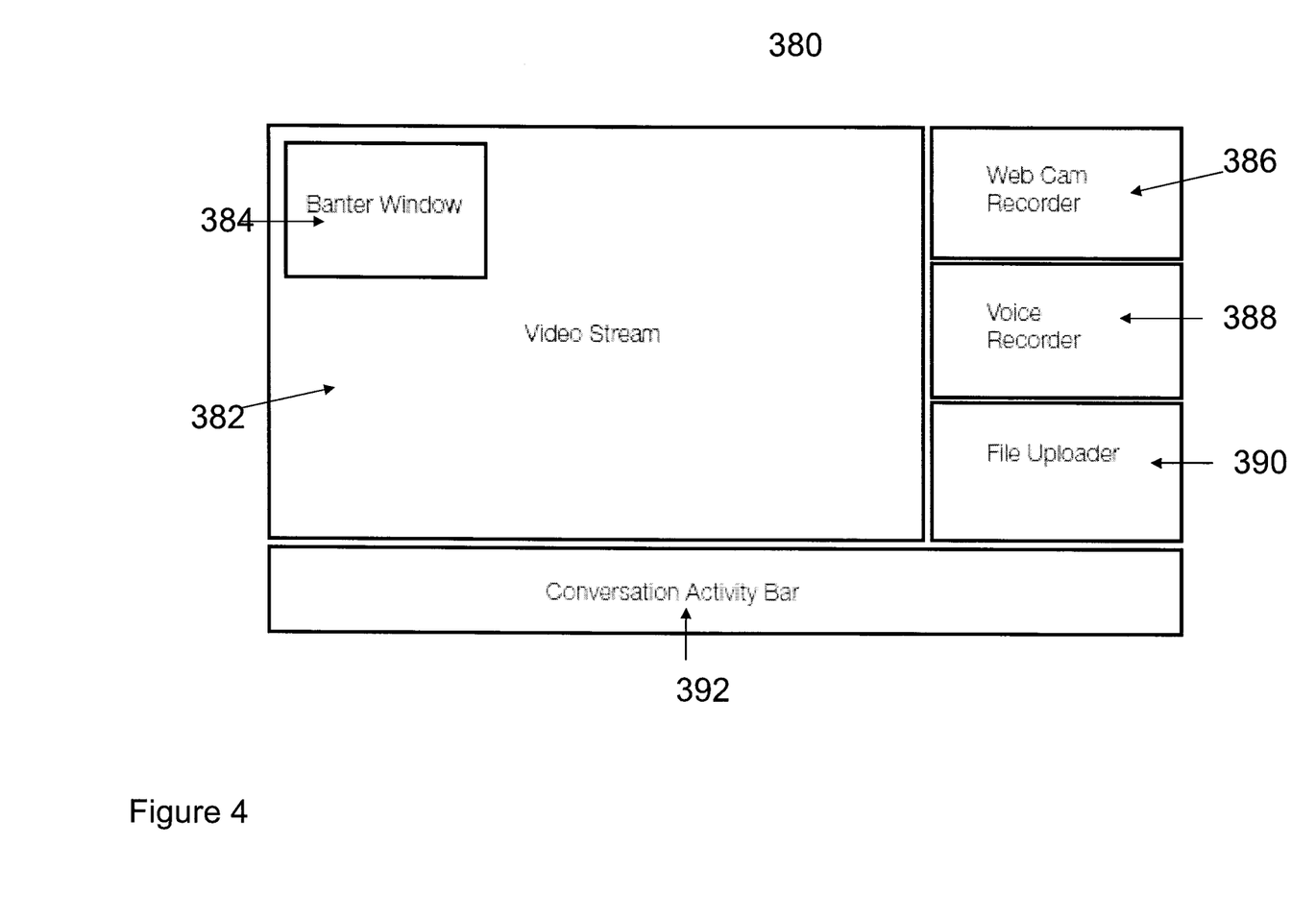
FIG. 4 is a view of the computer display of the conversation application and video stream in operation.

Referring to FIG. 4 there is shown a conversation window 380 which is the display that will be viewed on the monitor display of the client computers 220-224. In preferred examples this will be viewed through a web page of a social networking site such as Facebook.

The largest part of the window 380 is taken up by video stream 382 which shows the primary stream 250 from streaming server 12. In the top left hand corner of the video stream window 382 is a conversation window 384 which displays the conversation audio visual stream 252 that mostly comprises video that has been sent by other users in the same room 20 or 22. When there has been no media recently sent by any of the other users, there will not be a conversation stream 252 and the conversation window 384 will temporarily disappear allowing more of the primary video stream 250 to be viewed in window 382.

On the right hand side of window 380 is a web cam recorder section 386, a voice recorder section 388 and a file upload section 390. The web-cam recorder section 386 will show footage of whatever is being seen through the web-cam by which the user wishes to communicate. This section 388 also include controls to allow footage from this to be recorded. The voice recorder section 388 includes controls to record only the audio input from a microphone connected to computer 220-224. In the preferred embodiment the video or audio content is of a fixed or maximum length, such as 5 seconds. The advantages of the fixed file length are discussed below with reference to FIG. 6. The file uploader section 90 includes controls which allow the user to control when media are uploaded to the interactive server 218 to form part of the conversation stream 252. The file uploader section 90 may also include a preview function whereby a constructed piece of media, such as a pre-recorded video, image or graphic file, audio file etc., can be previewed before uploading to the server 218. This preview may display, for instance, through the conversation window 384 or through the web-cam recorder section 386. The file uploader section 390 also allows access to pre-recorded media such as video that has been saved from an earlier time.

At the bottom of the display 380 there is a conversation activity bar 392. The conversation activity bar 392 plays a very important part in allowing for efficient and effective conversation to take place without suffering from many of the problems discussed in the introduction to the application.

Figure 5:
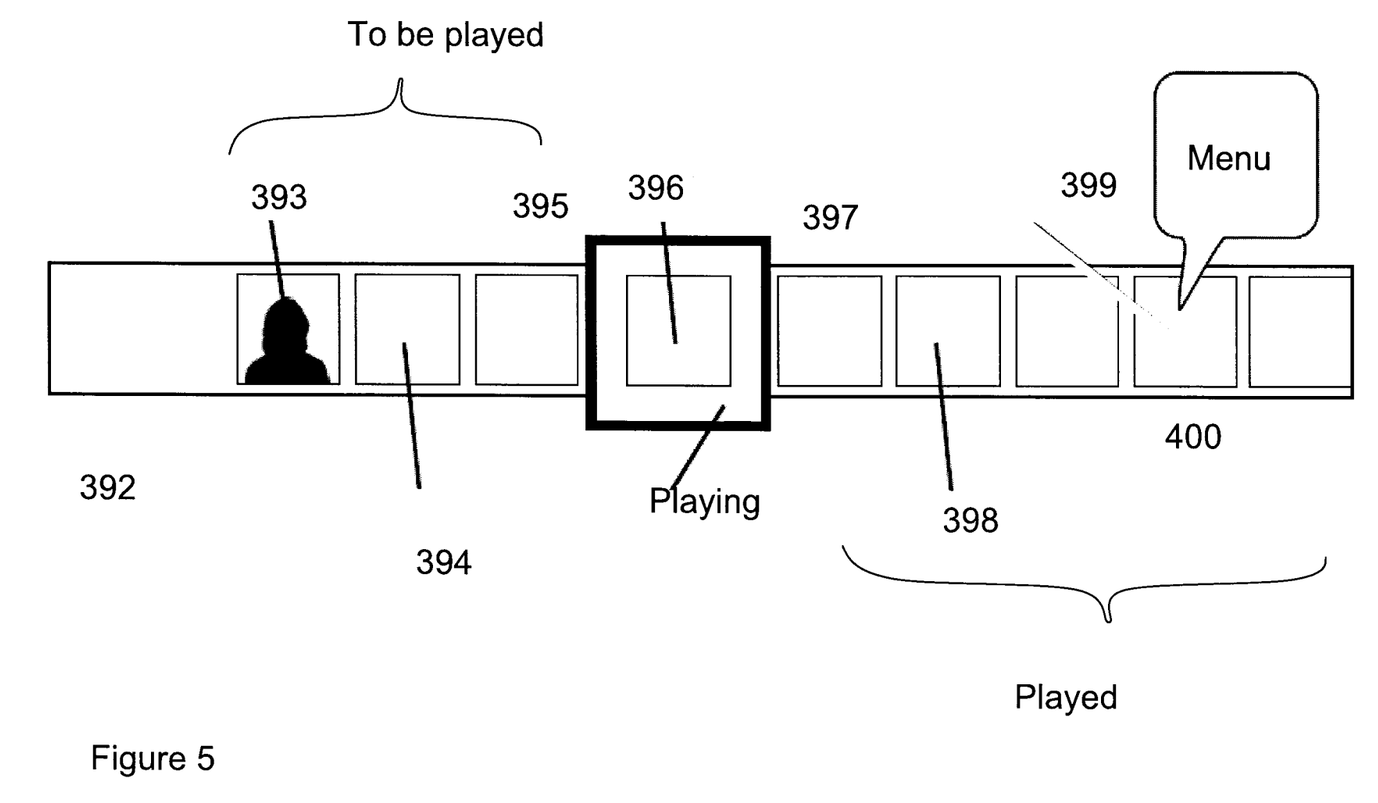
FIG. 5 is a more detailed view of the conversation bar shown in FIG. 4.

In FIG. 5 is shown an example of the conversation bar 392. The conversation bar 392 at any one moment in time comprises a linear sequence of icons 393, 394, 395, 396, 397, 398, 399 and 400. Each of the icons 393 to 400 correspond to a user 24-32 present in the relevant room 20 or 22, though more than one icon say icons 394 and 397 may correspond to the same user e.g. second user 28. These icons each represent a media submission which has been sent from the user corresponding to that icon which that user intended to form part of the conversation stream 252 to accompany primary stream 250. Typically the icons 393 to 400 may visually take the form a photograph of the user. Where the application system 10 is used via a social network such as Facebook the icons may be of whichever image the individual user may have chosen to have as their identification picture for that social networking site.

The conversation bar 392 and its contents of sequence of icons 393 to 400 is part of the Flash file sent from the interactive server 218 in the conversation stream 252 and (except for the problems with lag or slow connections) is expected to be displayed in exactly the same manner with exactly the same icons for all users in the same room 20 or 22.

The icons 393 to 400 are put in a linear order from left to right which represents the temporal sequence in which the media submissions are going be played through the conversation window 384. In most instances this will correspond with the time order sequence in which those media submissions were submitted by users via their display's file uploader section 390.

Icon 396 is surrounded by a square, physically larger than the remainder of the conversation bar 392 and includes a larger visual border, in order to provide emphasis to it. This emphasis represents the media submission that is being played in the conversation stream 252 and therefore normally being played through the user's client computer 220-224 at the current time. In the case of video and image submissions these will be being played through the conversation window 384. Where the submissions are merely audio then these can be played directly through the speakers without taking up part of the video stream section 382.

The icons 397, 398, 399, 400 to the right of icon 396 represent the most recently played media submissions and those to the left of icon 396 i.e., icons 393, 394 and 395 represent the next three media submissions to be played. In this case there are three submissions that have not yet been played.

In FIG. 5 a menu 402 is shown extending from icon 400. Such a menu 402 can be extended from any of the recently played icons 397-400 by for example a user right clicking the appropriate icon with a mouse. The menu provides options regarding that submission. These may include an option to save the submission at the client computer 220 or the server 218 (allowing future resubmission via filed uploader 390), and an option to report the submission as abusive to the room host (allowing barring or uninviting of the user who generated it).

Figure 6:
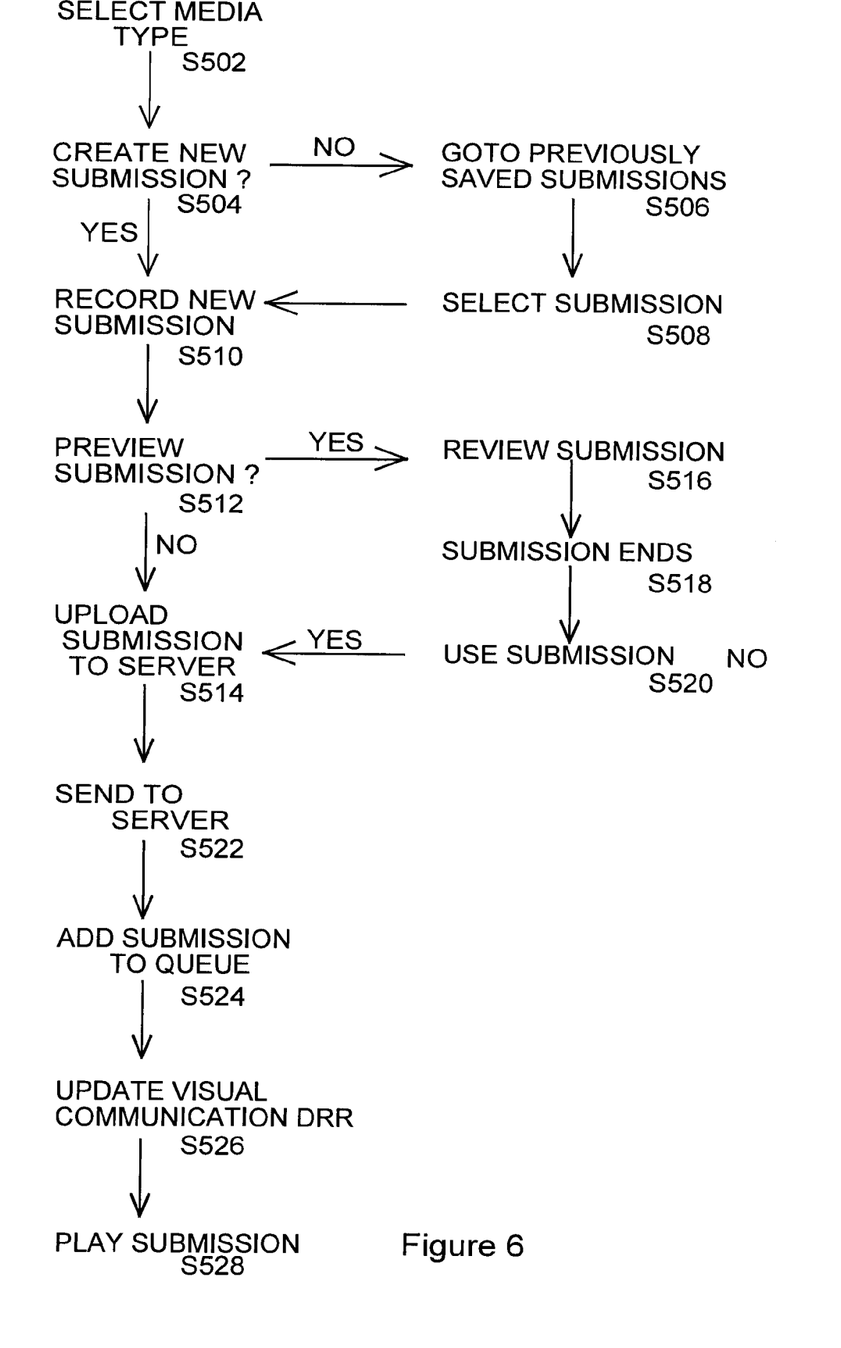
FIG. 6 is a flow chart of the process of submitting an element of conversation.

In FIG. 6 is shown the process 500 of submitting media to the interactive service 218. First at step S502, the user selects which type of media submission they wish to make. This could be in the form of video, audio, or image. Next at step S504 the user selects whether they wish to use a pre-existing media submission or create a new submission. If they wish to use a pre-existing submission they proceed to step S506 and if they wish to create a new media submission they proceed to step S510.

At step S506 the user uses the file uploader section 390 to cause the conversation application 219 to accesses the video on demand database 14 or more commonly media submissions that have already been saved by the user from previous conversations, using the menu 402, and stored at the server associated with that particular registered user. The user then selects their desired submission at step S508 and proceeds to step S512.

At step S510 the application 219 accesses the microphone or camera and records a message via video image or audio via camera recorder section 386 or voice recorder 388. In preferred embodiments the recorded media submissions are fixed to a pre-determined length. This is found to have particular advantages for efficient conversations as will be discussed below. Five seconds has been found to be an effective length of time, though this may change depending on the event being watched. For example, if the event is a sporting event then five seconds is found to be an effective length of time, but for other events e.g. a news event, a longer length of time may be more effective.

At step S512 the selection of the media submission is confirmed and the user is given the option of previewing the media submission. If they decide not to, the process continues to step S514. If the user does wish to preview a submission and proceed to step S516 they are shown or played, the selected media submission. In the case of video this may be played through the camera recorder section 386 or the conversation window 388. At step S518 the media submission ends and the user is asked at step S520 whether they wish to go ahead with submitting this media submission or whether they wish to start again. If they wish to start again they go back to step S504 and if they wish to continue they proceed to step S514. In other embodiments the process may go back to step S506 or S510 depending on which choice the user previously made at step S504.

At S514 the user selects to upload their selected and/or created media submission to the interactive server 218 via controls in file uploader section 390. At step S522 the submission is then sent to the server 218.

At step S524 the interactive server then adds this media submission to a queue of media submissions from users in the room which have not yet been played through conversation steam 252. At step S526 the conversation bar 392 is then updated at each display in the room through the conversation stream 252 to reflect the latest queue of media submissions at server 218.

At step S528 each of the media submissions in the queue are played in turn through each user's computer and in the case of video and images through the conversation window 384. Each of these submissions will take the predetermined length of time, e.g., 5 seconds to play before the next one will start in the window 384. In some embodiments submissions can be allowed to be shorter than the predetermined length but it is often better to provide embodiments where this is not the case because if each icon 393-400 in the conversation bar 392 represent the same length of time it increase the predictability of the conversation to users better allowing them to judge when they should next contribute.

Normally the queue of submissions created by the interactive server at step S524 and therefore shown in conversation bar 392 is in the order in which they were submitted. However, the time between the submissions is not relevant. That is, if there is a queue of submissions yet to be shown and there is a 10 second gap before another submission is made, this submission is merely put to the end of the queue and played as soon as the earlier queued submissions have finished without the 10 second delay between.

As each submission is played the currently playing submission is depicted in the centre as icon (96) with the large square and border surrounding it. Once it is finished, the particular icon representing it will move on to position (97) and all of the icons will move one to the right. Only a set number of previously played icon play submissions which in this case is 4 will be displayed and only a certain number of icons corresponding to yet to be played submissions is depicted. The number of yet to play submissions may be depicted as icons, may be around 6 or 7 and if the number queued exceeds this then a number may be displayed indicating the extra number in the queue. However, it has been found that in practice the existence of the queue means that people do not generally add submissions if the queue is already long, this prevents the queue from typically being much longer than the number of displayable icons. In the preferred embodiment the length of the queue is also set at pre-determined fix length and if the length of the queue is exceeded further submissions are not included in the queue. It is found that a maximum of six submissions is effective though this may be varied according to user preference, event shown, fixed length of submission etc.

Figure 7:
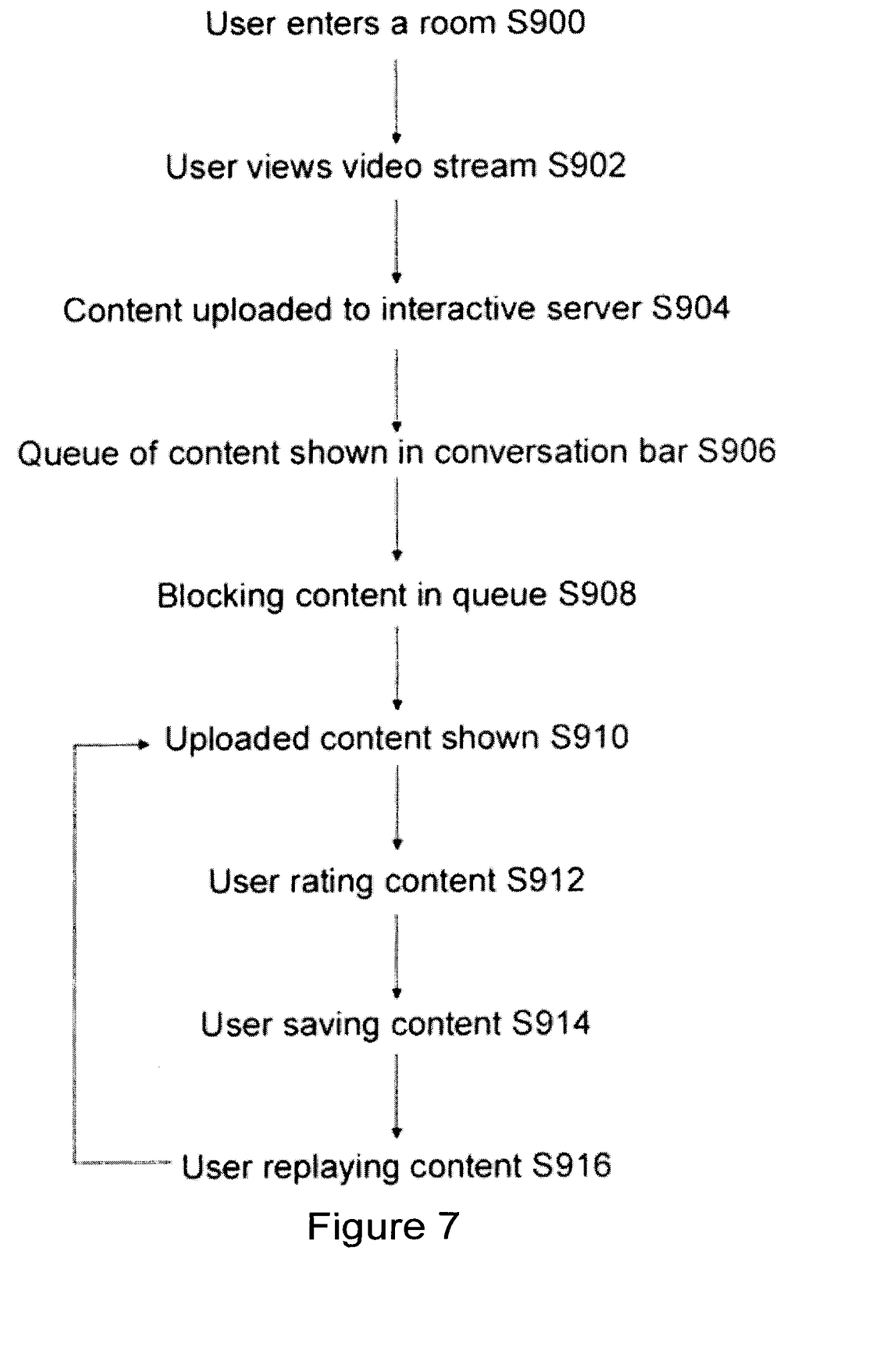
FIG. 7 is a flow chart of the process of viewing a conversation.

FIG. 7 is a flow chart of the process of a user viewing the primary stream 250 and conversation stream 252.

At step S900 the user enters a room to view a video stream. The room may be an open room 20, or a private room 22 which the user has created or has been invited to join. The process of a user selecting a room, or creating a room to invite guests is discussed in detail with reference to FIGS. 1 and 2.

At step S902 the user has selected a room/created a room and views the primary stream via the Flash player 240 application or whichever media playing application is used to play the content through stream window 382. As well as the user, other users are present in the room, that is to say are watching the same primary stream 250.

At step S904 other users upload media content to the interactive server 218. Typically the content uploaded is video content, though audio content may also be uploaded. For the reasons discussed previously, the length of the content is limited to five seconds in length, though in further embodiments the content may be of different lengths.

At step S906 the queue of uploaded content is represented in the conversation bar 392. The primary stream 250 is still being played in window 382 and the conversation bar 392 shows a sequence of icons 393 to 400.

Some embodiments allow a user to block other users at step S908. To do this the user identify a user in the conversation bar 392 whose content they wish to block and do so via menu 402. If the option to block the content is selected, the icon remains in the conversation bar but is not played when it is at the front of the queue. This allows the user the option of changing their mind and "unblock" the content at a later stage. Preferably the icon is altered to indicate that the content will not be played. For example, a cross may be superimposed on the icon, or the icon is greyed out. However, the order and timing at which the remainder of the media submissions will be shown is unaffected and will be shown at the same time as for other users who have not blocked content.

At step S910, the conversation stream 252 plays on the Flash player 240. The Flash player 240 displays the stream shown to all users of the room and within the conversation window 382. Therefore, Flash player 240 displays the uploaded content as a "picture-in-picture" (PiP) of the primary stream 250, with the PiP being the conversation window. Similar use of PiPs is well known in the field of TV broadcasting and display.

The conversation window 384 is typically displayed in the top left hand corner of the stream window 382, however, in further embodiments the PiP may be displayed in other parts of the screen. However, unlike conventional PiP where the sound from the main picture is dominant and the PiP is mute, the present invention splits the audio channel so that the audio content of the PiP may be heard. Typically, the level of volume for the PiP will in fact be dominant, around 60% of the total output. Therefore, the sound of the main video stream may be heard clearly as well as the audio content of the PiP. In other embodiments the volume level of the PiP may be changed depending on the content shown. For example, in a sporting event the sound level of the stream content may not be as important and therefore the volume level of the conversation stream 252 may increase, to say 75% of the total volume. However, if the event shown is say, a keynote address or music content, then the volume of the audio from the conversation stream 252 may be decreased to say 40% of the total audio level, thereby allowing the primary stream (e.g. keynote address) to be heard.

Once a particular uploaded media submission has been shown, the conversation stream plays the next uploaded submission and this is shown within conversation window 384. Additionally all of the icons on the conversation bar move one position to the right, to indicate to the user the movement of the queue. The new playing submission is now in the position of icon 396, which has the border to visually emphasise to the user that it is current submission being played. If there have been no more submissions made the queue of icons yet to be played will be one shorter. Preferably, only a small number of icons represent recently played and pending submissions are displayed e.g. four or five. Therefore, persons in a room can have a conversation regarding the event being shown, or indeed any other topic, as it is found if the queue is too long the topic of conversation may change between the time the content is uploaded and played.

Once the uploaded content has been played the user is given the chance to "rate" the video at step S912 using menu 402. In internet applications it is common to rate content, typically on a five star scale. After the content has been played the user may rate the video, by selecting the video in the conversation bar. The user can then rate the video on a scale of 1 to 5 stars. The ratings of the user are stored with the user profile and can be shown to other users. The ratings may be used to provide other non-technical features such as rankings, points awards etc. Additionally, the user may be given the option to report content, for example if the content is objectionable/illegal the uploaded content may be flagged for review.

At step S914 the user may choose to save a particular uploaded video. For example, if a user wishes to replay a particular video at a later time they may save the video at step S914. As the application is an internet based application, the videos that are saved are associated with the user account and stored on a server such as the interactive server. This allows several users to be associated with the same video content and prevents multiple copies of the same content being saved on the server. Therefore, if a later time the user logins into their account (perhaps on a different computer) they still have access to the saved video.

At step S916 the user may replay content shown in step S910. For example, if a user missed the content, or simply wishes to watch the content repeatedly they are presented with option of replaying the content. The user selects the icon representing the content in the conversation bar 392 and through menu 402 they are presented with the option of replaying the content. If the user selects replay, the content (if any) shown at step S910 ends and the content is replayed as at step S910. The interactive server therefore initiates the stream for the selected content which is then shown in conversation window 384. Therefore, for a short while the user may view different content at step S910 to other users in the same room if they are replaying a video. Once the replay is finished the conversation window will return to displaying the current conversation stream 252 being viewed by the rest of the room. However, because the most recently played submission will be viewable in the conversation bar 392 the users is able to catch up with any submissions they missed whilst watching the replay by replaying them also. Eventually there is likely to be submission in the queue that the user is happy to miss allowing them to return to the conversation in real time.

In a further embodiment, the user who has administrative control of the room (as at step S114 or S120 of FIG. 2) may control the content shown for all users. For example the administrator may delete/block a particular upload from the conversation bar 392 which would subsequently be deleted/blocked for all other users in the room. Similarly they may change the order of the content in the conversation bar 392 causing certain content to be preferentially played over other.

The above embodiments are found to provide a technical implementation that allows for effective video conversation along side a primary stream without great bandwidth requirements or complicated or expensive technology. The queuing of the submissions and the playing of them one after another, one at a time prevents the noise of multiple users speaking simultaneously. A further advantage is that the queuing of the video streams overcomes the problems faced with low or unreliable bandwidth connections. By limiting the conversations to a single stream the link quality is less likely to degrade with multiple users. The visual queue in the conversation bar 392 allows users to judge when and when not to speak. Rather than look for facial expressions they can simply look at how many more submission will be played before they can next speak. The fixed length of submissions is also of great benefit. It allows for true conversation rather than monologues developing, it prevents there being an indeterminate delay between an event happening on the primary stream and the next user being able to comment. It also combines synergistically with the conversation bar since the length of each submission in the queue is then known and the time left to the end of the queue or to any particular submission is calculable. Additionally, as at a given time there are only two streams (the primary content stream and the conversation stream) the quality of the stream is not affected by the submission of more content, thereby ensuring that the link quality does not degenerate due to an increase in the number of users.

Whilst the order of the queue will normally be the order of the uploading of submissions it may be permitted in particular circumstances for some users to skip ahead in the queue. In particular those running system 10 might invite a super user such as a celebrity to occasionally commentate on the primary stream 250. The submissions from the celebrity may be placed into the conversation stream 252 of every room for that primary stream 250. This might be played immediately in the conversation window 284 or more preferably inserted into the queues a set number (e.g. three or four submissions) back from the currently playing submission, and shown in the bar 292 allowing the conversing users to manage their conversation around it.

The invention claimed is:

1. A computer conversation system comprising:
  at least one server including a processor and memory and configured for communication with a plurality of user computers and to stream a central video to each of the plurality of user computers, each user computer comprising a display;
  a conversation application configured to record, or receive videos from at least some of the user computers whilst the server is streaming the centeral video to each of the plurality of user computers, wherein
  the at least one server further configured to concurrently send a sequence of recorded videos to the plurality of user computers, and simultaneously stream the recorded or received videos, whilst the server is streaming the central video to each of the plurality of user computers, wherein the sequence of recorded videos is based on the recorded or received videos;
  and the system is configured to send a file to at least some of the plurality of user computers which results in each of the plurality of user computers displaying the streamed central video from the server concurrently with an array of visual indicators in a set order, wherein each of a plurality of the visual indicators corresponds to at least one recorded video to be sent by the at least one server whilst the server is streaming the central video to each of the plurality of users, and the set order of the array corresponds to the order of at least part of the sequence of recorded video.

2. The computer conversation system of claim 1, wherein the conversation application is configured to record or receive further video from some of the individual computers of the plurality of user computers after those computers have displayed the array of visual indicators and to update the sequence to include videos based on the further video sent and to send a file to update the displayed array to include at least one visual indicator corresponding to further video.

3. The computer conversation system according to claim 1, wherein each of the recorded videos in the sequence of recorded videos is each of a fixed or equal duration.

4. The computer conversation system according to claim 1, configured to work alongside or to comprise a video streaming server which streams the same video to all of the plurality of user computers, the system configured to send the sequence of recorded videos so that it is displayed by the user computers alongside or within the video from the video server.

5. The computer conversation system according to claim 1, wherein the order of the sequence and array is the order in which the recorded or received videos, on which the sent sequence is based, are sent to the server from the user computers.

6. The computer conversation system according to claim 1, wherein the file results in the array including a visual indicator corresponding to the recorded video in the sequence that is sent contemporaneously, and which includes a visual indication, and/or is positioned in the array to indicate, that it so corresponds.

7. The computer conversation system according to claim 1, wherein the file results in the array including a plurality of visual indicators corresponding to videos that have previously been sent, and which include a visual indication, and/or are positioned within the array to indicate, that they so correspond.

8. The computer conversation system according to claim 1, wherein the same file and therefore same display is sent to all the plurality of user computers.

9. The computer conversation system according to claim 1, wherein at least some of the visual indicators indicate which computer, or which user that has logged in to a computer, recorded or sent the video on which the video in the sequence to which the indicator corresponds was based.

10. The computer conversation system according to claim 1, comprising an audio recording application and/or an image recording application to record or receive audio or image data from some, and preferably all, of the individual computers of the plurality of user computers, the at least one server configured to place audio and/or image data based on the received audio or image data within the sequence of recorded video.

11. The computer conversation system according to claim 1, configured to receive requests from individual computers of the plurality of computers to save a recorded video that has already been sent in the sequence and in response to each request to save the recorded video requested and to store that the request was made by the individual computer that has sent the request or to send it to the individual computer to be stored locally.

12. The computer conversation system according to claim 1, wherein the recorded videos in the sequence of recorded videos are each of a maximum duration.

13. The computer conversation system of claim 12 wherein the conversation application is configured to record video or receive video from some of the user computers having a pre-determined length of seconds.

14. The computer conversation system according to claim 1, configured to receive requests from the user computers to replay a recorded video that has already been sent in the sequence and in response to each request to resend the recorded video requested to the user computer that has sent the request.

15. The computer conversation system of claim 14, wherein the order and timing of sending the sequence and the file sent are unaffected by the requests.

16. The computer conversation system according to claim 1, wherein the system is configured to indicate to the plurality of computers that they form a first room of computers, the system configured for communication with a second plurality of user computers which each comprise a display, and to indicate to the second plurality of computers that they form a second room of computers, the at least one server configured to send a first sequence of recorded videos to the first room and a second sequence to the second room, the first sequence based on the videos recorded or received from individual computers from the first room and the second sequence based on the videos recorded or received from individual computers from the second room.

17. The computer conversation system of claim 16, configured to send a second file to the second room which results in each of the plurality of computers of the second room displaying an array of visual indicators in a set order, wherein each visual indicator corresponds to at least one recorded video that will later be sent by the server and the set order of the array corresponds to the order of at least part of the second sequence.

18. The computer conversation system of claim 16, wherein each of the computers forming a room receive the same video stream from the video streaming sever.

19. The computer conversation system of claim 16, wherein the at least one server is configured to receive a request to invite another computer or user, from at least one of the plurality of computers forming part of a room
 and in response to the request the system is configured to add the invited computer to the same room as the computer from which the request was received.

20. The computer conversation system of claim 19, configured so that at least one room is set up so that computers/users can only form part of the room if a request to invite them has been received from a specific computer.

* * * * *

UNITED STATES PATENT AND TRADEMARK OFFICE
CERTIFICATE OF CORRECTION

| | | |
|---|---|---|
| PATENT NO. | : 8,655,144 B2 | Page 1 of 1 |
| APPLICATION NO. | : 13/011282 | |
| DATED | : February 18, 2014 | |
| INVENTOR(S) | : Ross Alderson | |

It is certified that error appears in the above-identified patent and that said Letters Patent is hereby corrected as shown below:

On the title page, insert item (30):

--(30) Foreign Application Priority Data
Jun. 21, 2010 (GB) 1000974.4--

In the Claims

Column 12, claim 1, line 9, "centeral" should read --central--

Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,655,144 B2  
APPLICATION NO. : 13/011282  
DATED : February 18, 2014  
INVENTOR(S) : Ross Alderson Page 1 of 1

It is certified that error appears in the above-identified patent and that said Letters Patent is hereby corrected as shown below:

On the title page, insert item (30):

--(30) Foreign Application Priority Data  
Jun. 21, 2010 (GB) 1000974.4--

In the Claims

Column 12, claim 1, line 48, "centeral" should read --central--

This certificate supersedes the Certificate of Correction issued November 25, 2014.

Signed and Sealed this  
Twenty-third Day of December, 2014

Michelle K. Lee  
*Deputy Director of the United States Patent and Trademark Office*